US008395117B2

(12) United States Patent
Moon et al.

(10) Patent No.: US 8,395,117 B2

(45) Date of Patent: Mar. 12, 2013

(54) SPECTROPHOTOMETER USING MEDIUM ENERGY ION

(75) Inventors: Dae Won Moon, Daejeon (KR); Ju Hwang Kim, Daejeon (KR); Yeon Jin Yi, Daejeon (KR); Kyu-Sang Yu, Daejeon (KR); Wan Sup Kim, Daejeon (KR)

(73) Assignees: K-MAC, Daejeon (KR); Korea Research Institute of Standards and Science, Daejeon (KR)

( * ) Notice: Subject to any disclaimer, the term of this patent is extended or adjusted under 35 U.S.C. 154(b) by 83 days.

(21) Appl. No.: 13/056,427

(22) PCT Filed: Jul. 28, 2009

(86) PCT No.: PCT/KR2009/004177

§ 371 (c)(1), (2), (4) Date: Jan. 28, 2011

(87) PCT Pub. No.: WO2010/013921

PCT Pub. Date: Feb. 4, 2010

(65) Prior Publication Data

US 2011/0133081 A1 Jun. 9, 2011

(30) Foreign Application Priority Data

Jul. 31, 2008 (KR) ........................ 10-2008-0075139

(51) Int. Cl.
*G01N 23/225* (2006.01)

(52) U.S. Cl. ...................... 250/309; 250/397; 250/492.2

(58) Field of Classification Search .................. 250/309, 250/396 R, 492.21; 850/63

See application file for complete search history.

(56) References Cited

U.S. PATENT DOCUMENTS

| | | | | |
|---|---|---|---|---|
| 4,814,244 | A * | 3/1989 | Koguchi et al. | 430/30 |
| 5,063,294 | A * | 11/1991 | Kawata et al. | 850/63 |
| 6,323,484 | B1 | 11/2001 | Ide et al. | |
| 7,993,813 | B2 * | 8/2011 | Scott et al. | 430/296 |
| 2002/0146628 | A1 * | 10/2002 | Ota | 430/22 |
| 2007/0045534 | A1 | 3/2007 | Zani et al. | |
| 2009/0179656 | A1 * | 7/2009 | Mueller et al. | 324/751 |
| 2009/0220256 | A1 * | 9/2009 | Suhara et al. | 399/32 |
| 2010/0108902 | A1 * | 5/2010 | Frosien et al. | 250/396 R |
| 2011/0226969 | A1 * | 9/2011 | Horsky et al. | 250/492.21 |
| 2012/0076475 | A1 * | 3/2012 | Horsky et al. | 392/386 |

FOREIGN PATENT DOCUMENTS

| | | | |
|---|---|---|---|
| JP | 63102150 | A | 5/1988 |
| JP | 10282024 | A | 10/1998 |
| KR | 1019960000808 | B1 | 1/1996 |
| KR | 1020000029046 | A | 5/2000 |
| KR | 1020080070619 | A | 7/2008 |

* cited by examiner

*Primary Examiner* — Nikita Wells
*Assistant Examiner* — Johnnie L Smith
(74) *Attorney, Agent, or Firm* — The Webb Law Firm

(57) ABSTRACT

Provided is a spectrophotometer using medium energy ion. The spectrophotometer using medium energy ion is configured to include: an ion source 10 generating ions; a collimator 20 collimating the ions as a parallel beam; an accelerator 30 accelerating the parallel beam; an ion beam pulse generator 40 pulsing the accelerated ion beam; a focusing objective 50 focusing the pulsed ion beam on a specimen 1; a detector 60 detecting a spectroscopic signal of scattered ion from a specimen 1; and a data analyzer 70 analyzing and processing the spectroscopic signal detected by the detector 60.

8 Claims, 3 Drawing Sheets

SPECTROPHOTOMETER USING MEDIUM ENERGY ION

TECHNICAL FIELD

The present invention relates to a spectrophotometer using medium energy ion, and more particularly, to a spectrophotometer using medium energy ion that capable of analyzing small sample such as a ultra thin film for a semiconductor device by detecting and analyzing a scattered ion from a specimen by using medium energy ion beam.

BACKGROUND ART

Various types of measuring apparatuses for measuring compositions, structure, chemical characteristics, etc. of a surface of a specimen or a thin film formed on a specimen have been developed.

In particular, in case of highly-integrated semiconductor, there is a need to reduce a thickness of a silicon oxide layer to 1 nm or less in 100 nm technology generation, depending on International Technology Roadmap for Semiconductors (ITRS). Further, as integration is gradually increased, the thickness of the oxide layer is to be thinner. As a result, there is a need for a new technology for analyzing an ultra-thin oxide layer. In addition, since a doped layer is thinner and thinner, it is difficult to analyze the film by a traditional surface analyzing technique such as a secondary ion mass spectroscopy (SIMS) because of surface damage and low depth resolution. Generally, the existing surface analysis apparatuses tool do not have enough resolution for an ultra-thin film or has limited performance confirming only a portion of a structure or a composition of the ultra-thin film. Therefore, a need exists for an atomic resolution analysis technology.

A MEIS is developed to meet the requirements by using a medium energy ion beam. For example, an ion beam having medium energy of several tens to hundreds of keV has about 0.3 nm energy resolution in a depth direction from a surface. As a result, the spectrophotometer using medium energy ion using 50-500 keV ion beam is more excellent than other analysis apparatuses.

The MEIS can precisely measure the energy loss of scattered 50-400 keV proton, helium, and neon from a surface or near surface atom. MEIS of 50-400 keV has $10^{-3}$ energy resolution which leads the atomic depth resolution to measure the depth profile of elementary composition of a thin film. In addition, it can obtain information on an atomic structure by using a channeling/blocking effect of ion beam, such that it is very useful for analyzing the composition and structure for the surface and interface of the ultra-thin film. Further, the MEIS can accurately calculated collision cross section of ion it quantitatively and non-destructively analyze the composition and structure of the surface and interface of the ultra-thin film.

Due to these advantages, the MEIS is substantially the only analysis technology capable of quantitatively analyzing the composition and the depth distribution of the atomic structure (crystallinity, stress, etc) of the ultra-thin film of several nm with the resolution of the atomic layer.

However, the existing MEIS apparatus has a very large size and cannot measure or map a micro area by using the non-focused ion beam having a diameter of 1 mm. In addition, the conventional MEIS consists of expensive scanner for measuring scattering angle and energy distribution and has a long measurement time.

DISCLOSURE

An objective of the present invention is to provide a spectrophotometer using medium energy ion capable of measuring or mapping a micro area by using an focused ion beam.

Furthermore, another objective of the present invention is a spectrophotometer using medium energy ion capable of measurement without an complicated rotable energy analyzer with a short measurement time.

Another objective of the present invention is to provide a spectrophotometer using medium energy ion with a simple structure and a small size that capable of precisely analyzing motions of atoms at a surface and an interface by accurately measuring a scattering angle and a scattering position of an ion beam over time.

TECHNICAL SOLUTION

In one general aspect, a spectrophotometer using medium energy ion includes: an ion source 10 generating ions; a collimator 20 collimating the ion beams generated from the ion source 10 as a parallel beam; an accelerator accelerating the parallel beam; an ion beam pulse generator 40 pulsing the ion beam accelerated by the accelerator 30 to form the ion beam as a bundle of ion beam; a focusing objective 50 focusing the pulsed ion beam on a specimen 1; a detector 60 detecting a spectroscopic signal of an ion beam pulse obtained by ion from a specimen 1; and a data analyzer 70 transmitting the spectroscopic signal detected by the detector 60 to a computer to analyze and process data.

The detector 60 may be a delay line detector detecting a time required to detect the spectroscopic signal of the ion beam pulse scattered from the specimen 1.

The detector 60 may image the ion beam scattered from the specimen 1 in a two dimension to measure the detection position of the scattered ion beam and measure the scattering angle of the ion beam.

The diameter of the ion beam focused by the focusing objective 50 may be several μm.

The spectrophotometer using medium energy ion may further consists of a rotating plate 65 in order to rotate the specimen 1 or the detector 60. The detector is installed directly under the specimen 1 to detect the transmitted ion through the specimen 1 or installed lateral or upward direction of the specimen 1 to detect the backscattered ion of scattering angle of 0° to 90° by using the rotating plate 65.

The spectrophotometer using medium energy ion may further include a stigmator that corrects a distorted ion beam shape by compensating the astigmatism of the ion beam focused by the focusing objective 50.

The spectrophotometer using medium energy ion may further include a raster deflector which scan the focused ion beam by the focusing objective 50 on the surface of the specimen 1.

The raster deflector enables the spectroscopic analysis of the micro scale of the specimen 1 by scanning the focused ion beam on the surface of the specimen 1.

The ion source 10, the collimator 20, the accelerator 30, the ion beam pulse generator 40, and the focus objective 50 may be linearly equipped and integrated.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

| | |
|---|---|
| 10: Ion source | 20: collimator |
| 30: Accelerator | 40: Ion beam pulse generator |
| 1: Specimen | 50: Focusing objective |
| 60: Detector | 65: Rotating plate |
| 70: Data analyzer | |

BEST MODE

Hereinafter, a spectrophotometer using medium energy ion according to the present invention has the above-mentioned components, and will be described with the references to the drawings accompanied.

Figure 1:
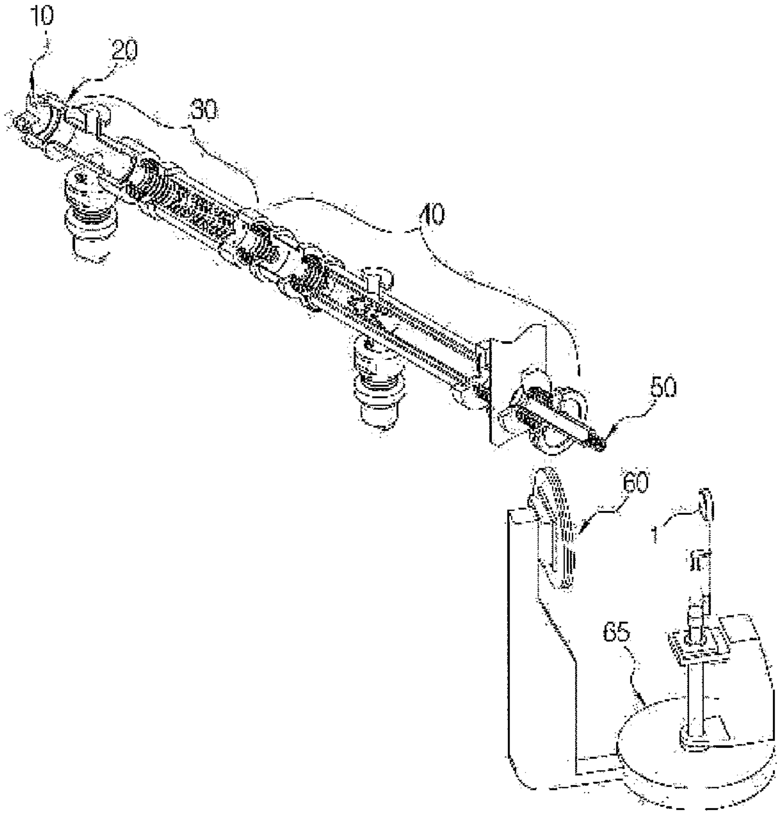
FIG. 1 shows a partial cross-sectional perspective view of a spectrophotometer using medium energy ion according to the present invention.
Figure 2:
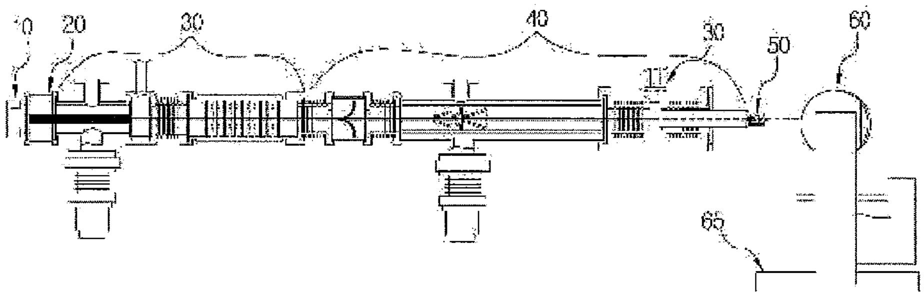
FIG. 2 shows a cross-sectional view of a spectrophotometer using medium energy ion structure with a beam path according to the present invention.
Figure 3:
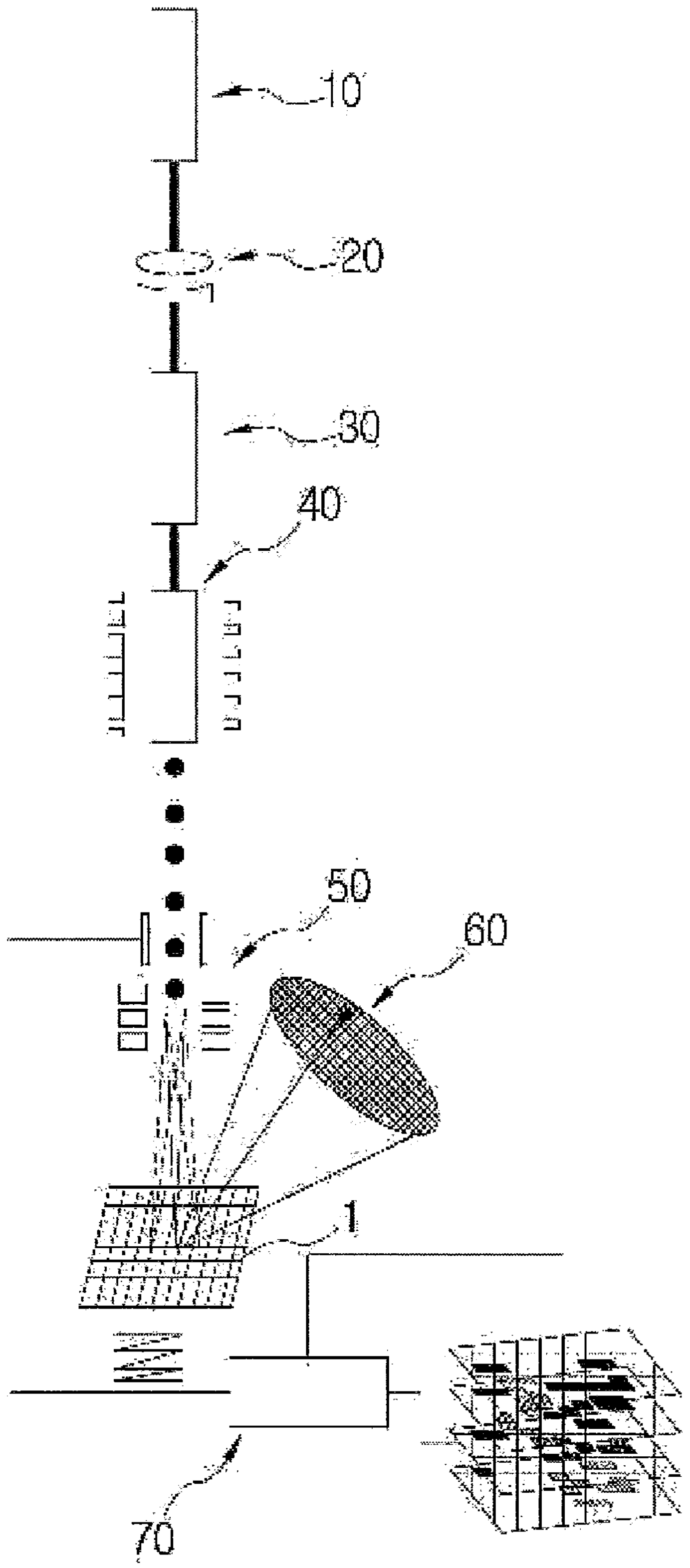
FIG. 3 shows a schematic diagram of a spectrophotometer using medium energy ion according to the present invention.
Figure 4:
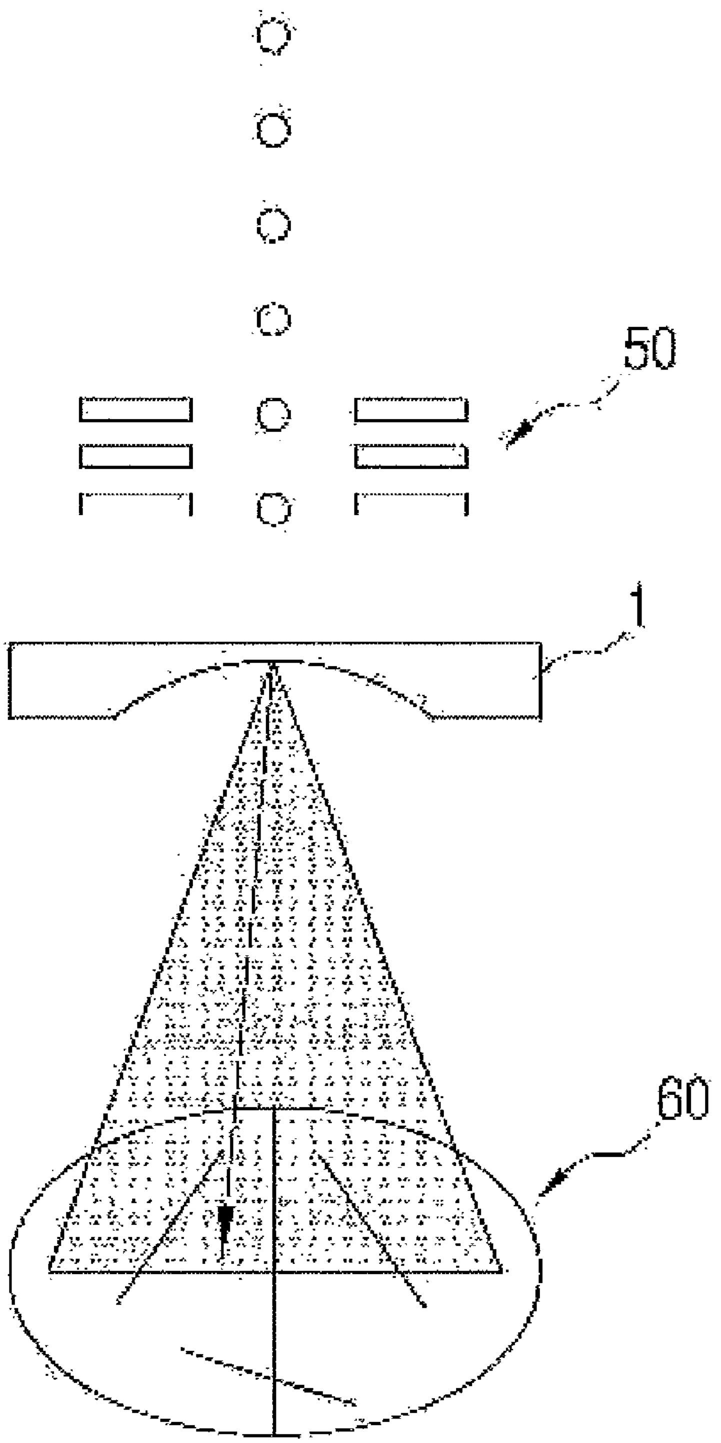
FIG. 4 shows a transmission mode of a spectrophotometer using medium energy ion according to the present invention.

FIG. 1 shows a partial cross-sectional perspective view of a spectrophotometer using medium energy ion according to the present invention, FIG. 2 shows a cross-sectional view of a spectrophotometer using medium energy ion structure with a beam path according to the present invention, FIG. 3 shows a schematic diagram of a spectrophotometer using medium energy ion according to the present invention; and FIG. 4 shows a transmission mode of a spectrophotometer using medium energy ion according to the present invention.

As shown in drawings, a spectrophotometer using medium energy ion according to the present invention is includes: an ion source 10 generating ions; a collimator 20 collimating the ions as a parallel beam; an accelerator accelerating the parallel beam; an ion beam pulse generator 40 pulsing the accelerated ion beam; a focusing objective 50 focusing the pulsed ion beam on a specimen 1; a detector 60 detecting a spectroscopic signal of an scattered ion from a specimen 1; and a data analyzer 70 analyzing and processing the spectroscopic signal detected by the detector 60.

The ion source 10 serves to generate ions. The ion source 10 which makes the plasma that is gaseous ion using radio frequency currents or discharge is already known.

The collimator 20, which severs to collimate ions generated from the ion source 10 as a parallel beam, prevents an ion beam from being diffused. Collimation of ion beam is performed by passing the ions through a collimation lens and passing the ions through an aperture of predetermined diameter such as several nm.

The accelerator 30 serves to accelerate the parallel beam. In this case, the parallel beam of a diameter of several nm is focused in the acceleration or, which is in turn accelerated as a parallel beam having a diameter of several to several tens μm.

The ion beam pulse generator 40 serves to pulse the ion beam accelerated by the accelerator 30 in order to make the ion beam a bundle. The structure of the ion beam pulse generator 40 is already known and is configured to include a quadrupole deflector and a pulse generator pulsing an ion beam.

The process of generating an ion beam pulse is as follows. The quadrupole deflector deflects the ion beam with a fast pulse by applying a bias voltage to one side of an x-direction deflector and applying voltage higher than the bias voltage to an opposite side thereof. In this case, the ion beam is formed as a fast pulse by passing through the aperture.

When the ion beam deflected in an x-direction again returns to the same path, a second ion beam pulse is generated that we do not want. As a result, the position of ion beam is returned to an original beam position by shifting the second ion beam pulse in a y-direction. To this end, the ion beam pulse with the same period of an x-direction is generated by the delay in the y-direction. As a result, the short ion pulse is focused on the specimen 1 by the focusing objective 50.

The focusing objective 50 serves to focus the pulsed ion beam on the specimen 1. In this case, the diameter of the focused ion beam may be several μm. As a result, the spectroscopic analysis can be performed in μm scale area by using the focused ion beam.

In addition, the spectrophotometer using medium energy ion may further include a stigmator correcting a beam shape of a distorted ion beam by compensating the astigmatism of ion beam focused by the focusing objective 50.

Furthermore, the spectrophotometer using medium energy ion may further include a raster deflector that scans the ion beam focused by the focusing objective 50 on the surface of the specimen 1.

By this configuration, the sample image is analyzed by scanning sample by focused the ion beam using the raster deflector.

In addition, the raster deflector may form a raster pattern by focusing the ion beam on the surface of the specimen 1 to perform the imaging analysis on the micro area of the specimen 1. The raster pattern generally has a rectangular shape or a square shape. As such, if the ion beam is focused in a series of all points by beam size scale, a three-dimensional composition distribution mapping may be implemented by combining the spectroscopic analysis with this image analysis for the sample.

The detector 60 serves to detect the spectroscopic signal of the scattered ion from the specimen 1. The spectroscopic signal includes of the scattered ion travels from sample to analyzer which converts to the energy of the scattering ion.

In this case, the detector 60 may be a DLD capable of detecting a position in addition to the time of the scattered ion from the specimen 1. Detecting scattered position on DLD enables the scattering angle, it is possible to appreciate an atomic structure of the specimen 1. As a result, the scattering angle and the scattering position of the ion beam may be imaged in a two dimension.

The detector 60 may be installed directly under the specimen (1) to detect the transmitted ion through the specimen (1). On the other hand, detector (60) may be installed laterally upward on the specimen 1 of an angle from exceeding 0° to below 90° as a reference of the direction of the incident ion beam to detect the backscattered ion from the specimen (1).

The spectrophotometer using medium energy ion may further include a rotating plate (65) which enables the rotation of the specimen (1) or the detector (60) to optionally control the scattering angle to be measured.

When the detector 60 is installed directly under the specimen 1 (see FIG. 4), it is possible to analyze the ultra-thin specimen such as a Transmission Electron Microscopy (TEM).

The data analyzer 70 analyzes and processes raw data acquired by DLD (60) to the 3D composition profile of the sample by scanning the 2D area of the sample and measuring depth profiling of each position.

Furthermore, the present invention may linearly equipped and integrate the ion source 10, the collimator 20, the accelerator 30, the ion beam pulse generator 40, and the focusing objective 50. Linear equipment of them prevent the beam loss and miniature the spectrophotometer using medium energy ion.

INDUSTRIAL APPLICABILITY

The present invention can focus the ion beam of several μm to measure and map the micro meter scale area, perform the measurement without using the expensive scanner, shorten the analysis time by shortening the measurement time, simplify the structure and miniature the spectrophotometer using medium energy ion, and accurately measure the scattering angle and the scattering position of the ion beam over time to precisely analyze the motions of atoms at the surface and the interface. In addition, the present invention can map the three-dimensional composition profile for the micro area and perform all the measurements even at the reflection transmission mode or the backscattered mode to accurately analyze the atomic structure for the ultra thin layer of specimen.

The invention claimed is:

1. A spectrophotometer using medium energy ion, comprising:

an ion source 10 generating ions;

a collimator 20 collimating the ions generated by the ion source 10 to a parallel beam;

an accelerator 30 accelerating the parallel beam;

an ion beam pulse generator 40 pulsing the ion beam accelerated by the accelerator 30 to be a bundle of ions;

a focusing objective 50 focusing the pulsed ion beam on a specimen 1;

a detector 60 detecting a spectroscopic signal of ions scattered from the specimen 1 including a time required to detect the scattered ions from the specimen 1 and an energy of the scattered ions from the specimen 1;

a data analyzer 70 transmitting the spectroscopic signal detected by the detector 60 to a computer to analyze and process data; and a rotating plate 65 for rotating the specimen 1 or the detector 60, wherein the rotating plate 65 enables the detector to be installed directly under the specimen 1 to detect ions transmitted through the specimen 1 or installed laterally upward from exceeding 0° to below 90° on the specimen 1 at the reference of the direction of the incident pulsed ion beam to detect the scattered ions from the specimen 1.

2. The spectrophotometer using medium energy ion of claim 1, wherein the detector 60 is a delay line detector (DLD) detecting a position on the DLD of the scattered ions with the time that the scattered ions travel from the surface of the specimen 1 to the detector 60 simultaneously.

3. The spectrophotometer using medium energy ion of claim 1 or 2, wherein the detector 60 images the scattered ions from the specimen 1 in two dimensions by measuring the detection position of the scattered ions which enables calculation of the scattering angle of the scattered ions.

4. The spectrophotometer using medium energy ion of claim 1, wherein the diameter of the ion beam focused by the focusing objective 50 is several μm.

5. The spectrophotometer using medium energy ion of claim 1, further comprises a stigmator correcting a distorted ion beam shape by compensating the astigmatism of the ion beam focused by the focusing objective 50.

6. The spectrophotometer using medium energy ion of claim 1 or 5, further comprises a raster deflector which scans a two dimensional micrometer area of the specimen 1 with the focused ion beam focused by the focusing objective 50 on the surface of the specimen 1.

7. The spectrophotometer using medium energy ion of claim 6, wherein the raster deflector forms a raster pattern by scanning the specimen 1 with the focused ion beam to perform the analysis on the micrometer area of the specimen 1.

8. The spectrophotometer using medium energy ion of claim 1, wherein the ion source 10, the collimator 20, the accelerator 30, the ion beam pulse generator 40, and the focus objective 50 are linearly equipped and integrated.

* * * * *